United States Patent [19]

Oxenrider et al.

[11] 3,899,563

[45] Aug. 12, 1975

[54] SYNTHETIC FIBERS HAVING IMPROVED SOIL AND STAIN REPELLENCY

[75] Inventors: Bryce C. Oxenrider, Florham Park; Cyril Woolf, Morristown, both of N.J.

[73] Assignee: Allied Chemical Corporation, New York, N.Y.

[22] Filed: July 23, 1973

[21] Appl. No.: 381,453

Related U.S. Application Data

[62] Division of Ser. No. 205,424, Dec. 6, 1971, Pat. No. 3,767,625, which is a division of Ser. No. 867,368, Oct. 17, 1969, Pat. No. 3,646,153.

[52] U.S. Cl. ............ 264/211; 260/75 N; 260/75 H; 260/75 T; 260/78 A; 260/78 L; 260/78 R; 260/78 S; 260/88.7 B; 260/93.7; 260/DIG. 19; 264/235
[51] Int. Cl. ..................... B28b 3/20; D01f 1/02
[58] Field of Search ............. 264/211, 235, 176 F; 260/296 AN, 29.6 AQ, 32.6 N, 404.5

[56] References Cited
UNITED STATES PATENTS

| | | | |
|---|---|---|---|
| 2,764,602 | 9/1956 | Ahlbrecht | 260/404.5 |
| 3,102,323 | 9/1963 | Adams | 264/211 |
| 3,244,669 | 4/1966 | Caldo et al. | 264/211 |
| 3,252,932 | 5/1966 | Bolstad et al. | 260/878 R |
| 3,296,063 | 1/1967 | Chandler | 264/211 |
| 3,409,647 | 11/1968 | Pittman et al. | 260/404.5 |
| 3,419,653 | 12/1968 | Briggs et al. | 264/211 |
| 3,464,922 | 9/1969 | Bernholz et al. | 264/211 |
| 3,546,329 | 12/1970 | Hirono et al. | 264/235 |
| 3,595,886 | 7/1971 | Sweeney et al. | 260/404.5 |
| 3,658,981 | 4/1972 | Fleming et al. | 264/176 F |

*Primary Examiner*—Joseph L. Schofer
*Assistant Examiner*—Herbert J. Lilling
*Attorney, Agent, or Firm*—Arthur J. Plantamura; Jack B. Murray, Jr.

[57] ABSTRACT

The soil and stain repellency of extruded filaments of a synthetic resin can be improved by incorporating in the resin a small amount, about 1%, of an amphipathic compound having from one to four fluoroalkyl groups pendent from an organic radical. The repellency is provided by the fluoroalkyl groups, which tend to be concentrated at the surface of the fiber.

4 Claims, No Drawings

SYNTHETIC FIBERS HAVING IMPROVED SOIL AND STAIN REPELLENCY

This is a division of application Ser. No. 205,424, filed Dec. 6, 1971, now U.S. Pat. No. 3,767,625, which in turn is a division of application Ser. No. 867,368, filed Oct. 17, 1969, now U.S. Pat. No. 3,646,153.

BACKGROUND OF THE INVENTION

This invention relates to synthetic fibers having improved soil and stain repellency.

It is desirable to impart soil and stain repellency to fabrics used in apparel, upholstery, draperies and similar applications. The present method used to impart soil and stain repellency to fabrics involves coating the fabric with an oil and water repellent compound. The coating is applied using common textile finishing techniques, such as treating the fabric with a padding bath of a solution or aqueous dispersion of the compound or spraying the surface of the fabric with the compound. In any case, the operation represents a separate step which must be performed upon a fabric after it has been dyed or printed. In addition, a subsequent curing step is normally required to set the coating. The coating is present on the fabric as a distinct phase which is subject to removal. Soil which penetrates the coating is not easily removed by laundering or dry cleaning because the soil becomes trapped beneath the coating.

Another drawback of the present method is the difficulty inherent therein of applying a uniform coating to the fabric. The coating tends to be distributed unevenly on the fabric and to form globules thereon.

SUMMARY OF THE INVENTION

We have found that oil and stain repellency can be imparted to extruded filaments of fiber-forming thermoplastic resins directly by adding certain fluorine containing compounds to the resin from which the fibers are prepared. Fibers prepared from the modified resin have improved soil and stain repellency and exhibit better stain release during laundering and dry cleaning. The fluorocompound additives of this invention reduce the surface energy of the fiber, but otherwise do not affect the mechanical (e.g. tensile) properties of the fiber. Consequently, the fibers can be woven into fabrics in the same manner as unmodified fibers, and in addition, can be used to prepare other textile products, such as carpets, having improved soil and stain repellency. A principal advantage of this invention is that oil and stain repellency can be readily imparted directly to the fiber by the fiber manufacturer, thereby eliminating the need for the manufacturer of the ultimate textile product to apply a repellent coating to the fabric.

The additive is added to the resin in an amount ranging from about 0.1 to about 2%, preferably about 0.5 to 1.5%, based on the weight of the resin. This small amount of additive causes a substantial lowering of the surface energy of the fiber, which is a direct measure of the ability of the fiber to repel oil and water borne soil and stain. For example, a fiber of unmodified nylon-6 normally has a surface energy of about 46 ergs/cm$^2$, whereas a fiber of nylon-6 containing 1% of an additive of this invention has a surface energy which is only slightly more than that of the additive itself (the additives have surface energies ranging from about 10 to 20 ergs/cm$^2$). To explain this phenomenon, it is theorized that the additive migrates to the surface of the fiber as the fiber is extruded to form a boundary layer between the rest of the fiber system and that which contacts the fiber. This boundary layer is not permanently removed by scouring, laundering, dry cleaning or dyeing, which indicates that it is stable to use conditions.

In spite of this boundary layer, the fiber can be dyed just like the unmodified fiber, which is surprising in view of the repellent nature of the layer.

The fluorocompound additives of this invention are characterized in their molecular structure in having from one to four fluoroalkyl groups, which provide the repellency, pendent from an organic radical which serves to make the additive dispersible in the resin. Hence, the additive is amphipathic in that one segment of the molecule has an affinity for the resin substrate while the remainder of the molecule, containing the perfluoroalkyl groups, is essentially repellent in nature.

In referring to the relationship between the additive and the resin, the terms "dispersed" and "dispersible" are used herein to indicate that the additive and the resin together form a macroscopically homogeneous single phase which behaves substantially like the resin alone in processing and in forming filaments. As is indicated in Examples 1–4, the additive can be present in the resin as (1) a solution of the additive in the resin, (2) a random distribution of additive particles throughout the resin, or (3) a concentration of additive particles near the surface of the resin.

The fluoroalkyl group is the more critical portion of the molecule and has the formula:

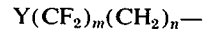

wherein $m$ is an integer from 1 to 16, n is an integer not greater than $m$ from 0 to 8, with the sum of $m$ plus $n$ being from 1 to 20, and Y is selected from the group consisting of $F_3C-$ and radicals having the formula

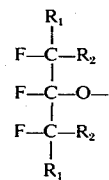

wherein $R_1$ and $R_2$ are fluorine or perfluoroalkyl groups having from one to two carbon atoms, provided that not more than three of the $R_1$ and $R_2$ groups are perfluoroalkyl groups. $R_1$ and $R_2$ are preferably fluorine. Preferred results are obtained when the total number of perfluorinated carbon atoms in each fluoroalkyl group is from 5 to 10 and the total number of fluoroalkyl groups is at least two. For convenience, the fluoroalkyl group is sometimes referred to hereinafter as "$R_f$".

The fluoroalkyl groups are pendent from an organic radical which makes the additive dispersible in the resin. Since the resin is normally basically a hydrocarbon containing functional groups, such as amide and ester linkages, dispersibility in the resin is achieved by having the organic radical portion of the additive molecule be of such structure as to effect chemical association, such as hydrogen bonding, between the resin and the organic radical portion. We have found that dispersibility can be achieved if the organic radical contains from 1 to 6 carbonyl groups (including the $>C=O$ present in acyl groups), from 1 to 21 methylene groups, from 2 to 8 nitrogen atoms, and from 0 to 2 phenyl groups, provided the total number of carbon and nitrogen atoms is from 5 to 35. In addition, the organic radical can contain other atoms, such as oxygen forming an ether linkage, which do not interfere with the dispersibility desired to be effected.

In addition to having the foregoing chemical structure, the additive must also possess certain physical properties. The additive must be substantially thermally stable at the temperature at which the filament is extruded. This temperature normally is within the range of 200° to 350°C. An additive is thermally stable if it survives the extrusion process without forming undesirable decomposition products and without decomposing to such an extent as to lose an appreciable amount of effectiveness in imparting soil and stain repellency to the filament. In addition to being thermally stable, the additive must also be nonfugitive, i.e., not appreciably volatile, at the temperature of extrusion, otherwise it would escape from the filament. A further requirement is that the additive must itself have a low surface energy in order to impart a low surface energy to the filament. To be suitable, the additive must have a surface energy of less than 20 ergs/cm².

We have identified the following classes of compounds as being suitable additives in the practice of this invention:

A. Monoamides of the formula

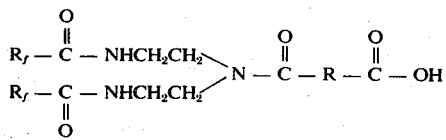

wherein R is an alkyl diradical of 1 to 8 carbon atoms, an alkylene diradical of 2 to 8 carbon atoms, or a phenyl diradical;

B. Diamides of the formula

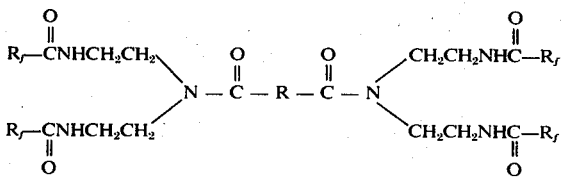

wherein R is an alkyl diradical of 1 to 8 carbon atoms, an alkylene diradical of 2 to 8 carbon atoms, a phenyl diradical, or a dicarboxy phenyl diradical having the formula

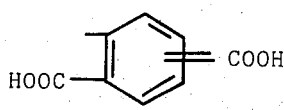

C. Hexahydrotriazines of the formula

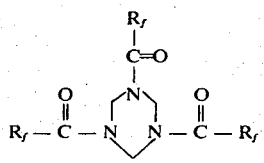

D. Bisamides of the formula

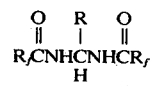

wherein R is hydrogen, trichloromethyl, or a phenyl radical;

E. Isocyanurate esters of the formula

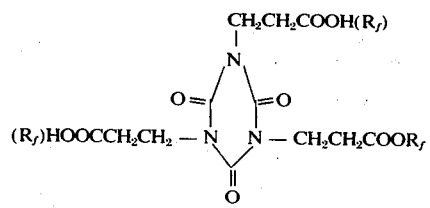

F. Isocyanurate esters of the formula

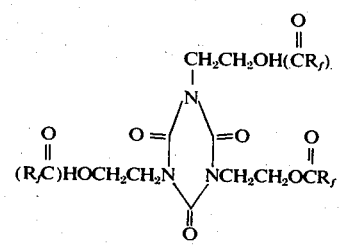

G. Substituted ureas of the formula

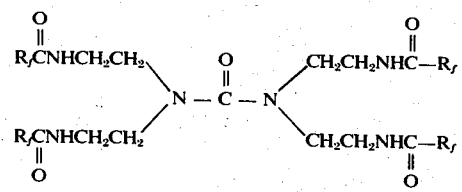

H. Substituted ureas of the formula

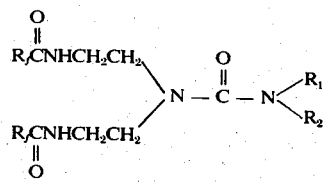

wherein $R_1$ and $R_2$ are independently hydrogen or an alkyl radical of 1 to 6 carbon atoms, an alkylene radical of 2 to 6 carbon atoms, or a phenyl radical;

I. Substituted ureas of the formula

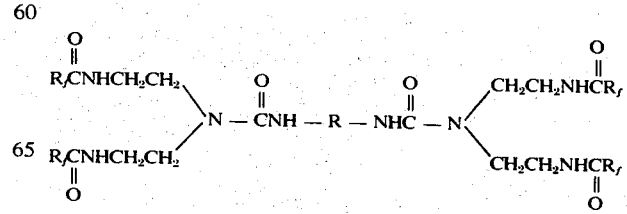

wherein R is an alkyl diradical of 1 to 13 carbon atoms, an alkylene diradical of 2 to 13 carbon atoms, or an aryl, aralkyl, or aralkylene diradical of 6 to 13 carbon atoms;

J. Substituted oxamides of the formula

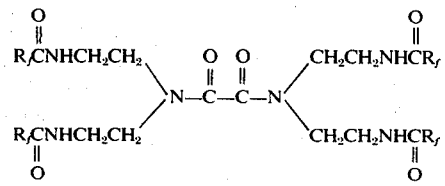

Table I is a list of compounds which illustrate each of the above classes of compounds. The maximum use temperature is the temperature to which the compound remains thermally stable and essentially nonfugitive.

wherein R has the meaning previously given for the additives of Class A. The reaction is carried out in an inert solvent, such as acetone, at temperatures ranging from room temperature to the reflux temperature of the reaction mixture. The additives of Class A, as novel compositions of matter, are the subject of copending application Ser. No. 867,371, filed Oct. 17, 1969, now U.S. Pat. No. 3,754,026, filed concurrently herewith, the pertinent subject matter of which is incorporated herein by reference.

The cyclic anhydride reactants are well known materials. The triaza reactants are readily prepared by reacting a lower alkyl ester of an acid having the formula $R_fCOOH$ with an amine having the formula $NH_2(CH_2)_2NH(CH_2)_2NH_2$, wherein $R_f$ has the meaning given for the compounds of this invention. Esters derived from acids having the formula $R_fCOOH$ wherein

| Class | $R_f$ | R | Maximum Use Temperature °C | Surface Energy ergs/cm² |
|---|---|---|---|---|
| A | $C_3F_7O(CF_2)_3$— | —$(CH_2)_3$— | 225 | 13.5 |
|  | $C_3F_7O(CF_2)_5$— | —$(CH_2)_3$— | 250 | 13.5 |
|  | $CF_3(CF_2)_6$— | —$(CH_2)_3$— | 200 | 15.5 |
| B | $C_3F_7O(CF_2)_6$— | HOOC—⌬—COOH | 250 | 14.1 |
|  | $CF_3(CF_2)_6$— |  | 300 | 12.2 |
| C | $C_3F_7O(CF_2)_4$— | m—$C_6H_4$ | 250 | Not Tested |
| D | $C_3F_7O(CF_2)_4$— | —$CCl_3$ | 225 | Not Tested |
| E | $CF_3(CF_2)_6$— (monoester) |  | 250 | 15.5 |
|  | $CF_3(CF_2)_6$— (diester) |  | 260 | 12.5 |
|  | $CF_3(CF_2)_6$— (triester) |  | 300 | 13.0 |
|  | $C_3F_7O(CF_2)_2$— (monoester) |  | 250 | 16.5 |
|  | $C_3F_7O(CF_2)_6$— (diester) |  | 250 | 13–14 |
| F | $CF_3(CF_2)_6$— (diester) |  | 260 | 14 |
| G | $CF_3(CF_2)_6$— |  | 225 | 16 |
| H | $CF_3(CF_2)_6$— | $R_1$ is H, $R_2$ is phenyl | 225 | 16.5 |
|  | $CF_3(CF_2)_6$— | $R_1$ and $R_2$ are H | 225 | 16.1 |
| I | $CF_3(CF_2)_6$— | ⌬—$CH_2$—⌬ | 260 | 15.8 |
|  | $CF_3(CF_2)_6$— | —$(CH_2)_6$— | 260 | 15 |
|  | $CF_3(CF_2)_6$— | ⌬—$CH_3$ | 260 | 13.5 |
| J | $CF_3(CF_2)_6$— |  | 300 | 15 |

PREPARATION OF ADDITIVES

The additives of Class A are prepared by reacting a triaza compound having the formula

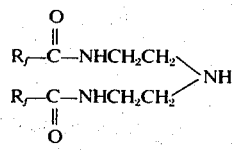

with a cyclic anhydride of the formula

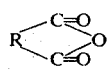

the Y group of the $R_f$ component is $F_3C$— are well known materials and can be made from the acids, which are generally available commercially. Acids wherein Y has the formula

can be prepared from a telomer halide having the formula

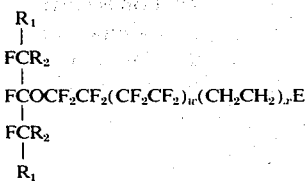

wherein $R_1$ and $R_2$ have the afore-stated meanings, w and x are integers indicating the respective degrees of telomerization, and E is bromine or iodine. These telomer halides and their method of preparation are described in U.S. application Ser. No. 633,359 filed Apr. 25, 1967 now U.S. Pat. No. 3,514,487, the pertinent subject matter of which is incorporated herein by reference. The telomer halides are prepared by reacting telogens of the formula

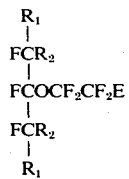

with telomerizable unsaturated compounds, i.e., tetrafluoroethylene and ethylene, the reaction being initiated by heat or free radical catalyst. The telogens are prepared by reacting the corresponding perfluorinated ketone with an ionizable fluoride salt, e.g. CsF, to form the corresponding organic salt, and then reacting the organic salt with tetrafluoroethylene and either bromine or iodine. Preparation of the telogens is described in greater detail in U.S. Pat. No. 3,453,333.

Acids having the formula

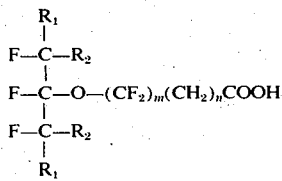

wherein $n$ is 0 can be prepared by reacting the corresponding telomer halide with ICN or $(CN)_2$ at pressures above 20 atmospheres and at temperatures above 300°C. to form the nitrile, followed by hydrolysis of the nitrile in accordance with conventional methods to form the acid. Acids wherein $n$ is greater than zero can be prepared by reacting the corresponding telomer halide with an alkali metal cyanide in the presence of dimethyl sulfoxide at temperatures between 60° and 100°C. to form the nitrile, from which the acid can be prepared in accordance with conventional methods. The acid can also be prepared (regardless of whether $n$ is 0 or greater) by reacting the telomer halide with sulfur trioxide, followed by hydrolysis of the reaction product to obtain the acid. By this method, the acid contains one less carbon atom than the telomer halide from which it was prepared. Also, the acid thus formed can be converted to the corresponding telomer iodide for further telomerization by reaction with alkalifree silver oxide to form the silver salt, followed by reaction of the silver salt with powdered iodine to form the telomer iodide. By this method, acids having either an odd or even number of hydrocarbyl or fluorocarbyl groups can be prepared.

The additives of Class B are prepared by reacting the triaza compound referred to above with a diacid chloride having the formula ClOCRCOCl, where R has the meaning previously given for the additives of Class B, with the exception that R is not a dicarboxy phenyl radical. In order to prepare the additive of Class B wherein R is a dicarboxy phenyl radical having the formula

pyromellitic anhydride is used as the reactant in place of a diacid chloride. The reaction is carried out in an inert solvent, such as acetone, at temperatures ranging from room temperature up to the reflux temperature of the reaction mixture. The additives of Class B, as novel compositions of matter, are the subject of copending application Ser. No. 867,373, filed Oct. 17, 1969, now U.S. Pat. No. 3,657,235 filed concurrently herewith, the pertinent subject matter of which is incorporated herein by reference.

The additives of Class C are prepared by reacting a compound of the formula $R_fON$ with trioxane in the presence of a catalytic amount, about 1% by weight, of a strong acid, such as $H_2SO_4$. The additives of Class C, as novel compositions of matter, and their method of preparation are the subject of copending application Ser. No. 867,370, filed Oct. 17, 1969, now U.S. Pat. No. 3,657,235, filed concurrently herewith. Nitrile reactants having the formula $CF_3(CF_2)_m(CH_2)_nCN$ are known compounds and can be prepared from commercially available materials in accordance with known methods. Nitrile reactants having the formula

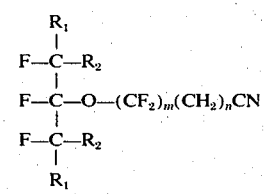

can be prepared from telomer halides in accordance with the methods described in the penultimate paragraph above, which methods are described in greater detail in Canadian Patent Nos. 823,673 and 823,674corresponding to U.S. Ser. Nos. 721,115 and 721,117, respectively, both U.S. applications having been filed on Apr. 12, 1968, the pertinent subject matter of which is incorporated herein by reference.

The additives of Class D are prepared by reacting a nitrile of the formula $R_fCN$ with an aldehyde of the formula RCHO, wherein R has the meaning previously given for the additives of Class D, in the presence of an acid catalyst. Additives having the formula $R_fCONHCH_2NHCOR_f$ are obtained as by-products in the preparation of the additives of Class C. The additives of Class D, as novel compositions of matter, are the subject of copending application Ser. No. 867,372, filed Oct. 17, 1969, now U.S. Pat. No. 3,786,093, filed concurrently herewith, the pertinent subject matter of which is incorporaated herein by reference.

The additives of Class E are prepared by reacting tris-(2-carboxyethyl)isocyanurate with an alcohol of the formula R$_f$OH under anhydrous conditions, using as a solvent a perfluorocarboxylic acid having up to 8 carbon atoms. The reaction product contains a mixture of mono-, di- and triesters. The additives of Class E, as novel compositions of matter, and their method of preparation are more particularly described in copending application Ser. No. 808,681, filed Mar. 19, 1969, the pertinent subject matter of which is incorporated herein by reference.

The additives of Class F are prepared by reacting tri(-2-hydroxyethyl)isocyanurate with an acid having the formula R$_f$COOH under anhydrous conditions using an inert solvent. The reaction product contains a mixture of mono-, di- and triesters. The additives of Class F, as novel composition of matter, and their method of preparation are more particularly described in copending application Ser. No. 808,681, filed Mar. 19, 1969, the pertinent subject matter of which is incorporated herein by reference.

The substituted urea additives of Classes G, H, and I are readily prepared by refluxing the triaza compound previously referred to with the appropriate isocyanate or diisocyanate in a solvent such as acetone. The appropriate isocyanate or diisocyanate compounds are well known in the art.

The additives of Class J are prepared in accordance with the method used to prepare the additives of Class B using oxalyl chloride as the diacid chloride reactant.

PREPARATION OF FIBERS

The filaments of the invention are prepared by forming an intimate blend of the additive and the resin and then extruding the blend into filaments in accordance with methods known to the art. The method of forming the blend is not critical. The blend can be formed by treating the resin in powder form with a solution of the additive and then extruding and pelletizing the treated resin after it has been allowed to dry. Another method of forming the blend comprises dry blending the additive with the resin in powder form and then working the mixture on a rubber mill or similar device.

The incorporation of the additive into the resin does not interfere with the formation of the filament or fibers drawn therefrom. Although the fluoroalkyl groups of the additive tend to render the additive incompatible with the resin, the additive does not disturb the normal macroscopic homogeneity of the polymer phase. This is surprising in view of the critical rheological conditions involved in the extrusion of filaments and the drawing of fibers.

By examining the filaments of this invention with the aid of a photomicroscope, we have found that the additive can be present in the filament in any of the following ways: (a) as finely dispersed, randomly distributed particles in the resin matrix, (b) as finely dispersed particles concentrated at the fiber surface, (c) as an invisible solution in the resin matrix. But regardless of how the additive is present, it effectively imparts antisoiling and antistaining properties to the filament.

In some instances, the surface energy of the filament can be lowered even further by annealing the filament after it has been extruded. Annealing increases the mobility of the additive and allows it to migrate to the surface of the filament. Annealing is preferably carried out at the highest practical temperature, which is normally just below the temperature at which degradation of the fiber occurs, and for an optimum period which can readily be determined for each particular fiber by simple experiment. For fibers prepared from nylon-6, the preferred period is two to four hours. Annealing is normally performed in an inert atmosphere, such as nitrogen, to prevent oxidative degradation of the fiber.

This invention is generally applicable to filaments prepared from any fiber-forming thermoplastic resin, such as polypropylene, polyamide, polyester, polyacrylonitrile and blends thereof. Particularly good results are obtained with polyamide and polyester resins (including blends thereof), especially with polyamide resins.

When nylon-6 or nylon-66 is the resin, especially preferred results are obtained using the additive 1,7-bis(4-perfluoroisopropoxybutyryl)-1,4,7-triazaheptane monoglutaramide.

The practice of this invention is illustrated by the following examples.

EXAMPLE 1

Preparation of Additive 60.4 grams of 1,7 bis(4-perfluoroisopropoxybutyryl)-1,4,7-triazaheptane were dissolved in 250 ml of acetone. To this solution was added a solution of 8.35 grams of glutaric anhydride in 100 ml of acetone. The reaction mixture was stirred at 50°C for 1 hour, then cooled and diluted with water. The product layer was dissolved in ether, washed with water, treated with charcoal and finally dried over MgSO$_4$. The product obtained after evaporation of the ether solution was 1,7 bis(4-perfluoroisopropoxybutyryl)-1,4,7-triazaheptane monoglutaramide, a waxy solid having a melting point of 80°C, and was obtained at a yield of about 100%.

Preparation of Fibers

Commercially available pellets of nylon-6 were comminuted with Dry Ice. The additive was dissolved in acetone and applied to the comminuted nylon. The coated nylon was dried at 70°C and 5 mm. Hg overnight, then extruded into monofilament and pelletized. The pellets were then extruded into fiber from a Reifenhauser extruder using a 7 hole, 20 mil die and a screen pack as filter. The resin was extruded at a temperature of about 260°C and at an extrusion rate of 60 to 75 feet/minute. The extrudate was quenched by an air stream at 16°C. The denier was precontrolled by the rate of fiber take-up with subsequent variable melt draw. Filaments of 60 denier, 16 denier and 8 denier were prepared by this technique. The filaments were subsequently drawn at a ratio of 4:1. The filaments contained 1 percent by weight of the additive.

Fiber Tests

The surface energy of the filaments was measured and found to be as follows:

Undrawn

| Denier | Surface Energy ergs/cm$^2$ |
|---|---|
| 60 | 18 |
| 16 | 25 |
| 8 | 32 |

Drawn 4:1

| | |
|---|---|
| 15 | 18–22 |

Undrawn-Continued

| Denier | Surface Energy ergs/cm² |
| --- | --- |
| 4 | 27–32 |
| 2 | 35–40 |

In comparison, the surface energy of unmodified nylon-6 fiber is about 46 ergs/cm². The surface energy of a fiber directly reflects its ability to repel oil and water borne soil and stain.

The lower surface energy of the 60 denier fiber is presumably due to the more favorable surface to volume ratio of the fiber, which allows a greater concentration of the additive at the surface. However, we found that increasing the amount of additive to 1.5% effected no further decrease in the surface energy of the fibers, and that increasing the level to 2% tended to cause dripping in the spinning operation.

Photomicrographs of the fibers revealed no visible additive particles, indicating that the additive was either dissolved or very finely dispersed in the resin matrix.

Annealing at 120°–150°C for 2 to 4 hours in an inert atmosphere causing a lowering of the surface energy of the undrawn 16 and 8 denier fibers to 18–22 ergs/cm² and 25–27 ergs/cm² respectively. This indicates thaat the additive is capable of migrating through the resin matrix to the surface.

Neither scouring the fibers nor wiping them with CCl₄ produced any change in the surface energy.

The fibers were dyed according to standard procedures using various commercially available dyes, such as Necelan Blue FFRD, C.I. Disperse Blue 3 and Kiton Fast Blue CB. It was found that the fibers containing the additive were as receptive to the dye as unmodified fibers and that the dye was just as colorfast when the fibers were subjected to laundering and drycleaning. Furthermore, dyeing had no adverse effect on the surface energy of the fibers containing the additive.

A test cloth was prepared using the 15 denier fiber and the ability of the cloth to resist common household stains, including catsup, French dressing, spinach, chocolate and hot coffee, was compared with that of a control cloth prepared from unmodified nylon-6 fiber. The cloth prepared from the modified fiber had better stain resistance and also exhibited better stain release during subsequent laundering.

EXAMPLE 2

Preparation of Additive

To 202 grams perfluorooctanoyl chloride were added 45 ml anhydrous methanol. The temperature rose to about 65°C. as HCl was evolved. An additional liter of methanol was added over a period of about 1 hour. The mixture was then heated at about 65°C. for about 90 minutes. The reaction product was separated from the layer of unreacted methanol, washed with water, dried overnight over $Na_2SO_4$ crystals, filtered and distilled. 164 grams of methyl perfluorooctanoate were recovered.

To the methyl ester prepared above were added 20.6 grams diethylenetriamine dropwise, with the temperature rising to about 70°C. The mixture was maintained at that temperature for one hour with stirring. The reaction product solidified as the mixture cooled to room temperature. The product was recrystallized from acetonitrile and dried overnight at 60°C. and 1 mm Hg. 135 grams of 1,7 bis(perfluorooctanoyl)-1,4,7-triazaheptane were recovered.

To a solution of 8.9 grams of the triaza compound prepared above in 40 ml of acetone were added a solution of 1.5 grams glutaric anhydride in 10 ml of acetone. The mixture was stirred at room temperature for about 20 minutes, at which time a haze, indicating a precipitate, developed. The mixture was stirred for another four hours and then allowed to stand overnight. The product was recovered by filtration, washed with water, and vacuum dried. 9.7 grams of 1,7 bis(perfluorooctanoyl)-1,4,7-triazaheptane monoglutaramide were recovered.

Preparation of Fibers

Fibers were prepared using 1.0% of the additive prepared above. An undrawn filament having a diameter of 16 mils (about 1300 denier) had a surface energy of less than 18 ergs/cm². When the filament was drawn 4:1, the resulting fiber had a surface energy of 22 ergs/cm².

Photomicrographs of the fibers revealed that the additive is present as a distinct band under the skin of the fiber. This is in contrast to Example 1, where the additive was not visible at all.

EXAMPLE 3

Preparation of Additive 985 grams of 1,7 bis(perfluorooctanoyl-1,4,7-triazaheptane and 143 grams of triethyl amine were dissolved in 5 liters of acetone. To this solution was added dropwise a solution of 112 grams of isophthalylchloride in one liter of acetone. The reaction mixture was stirred at 50°C for 4 hours, then cooled to room temperature. The resulting precipitate was recovered, washed with acetone and was recrystallized from hot ethanol. The product was 1,7 bis(perfluorooctanoyl)-1,4,7-triazaheptane isophthalamide, a white solid having a melting point of 178°C, and was obtained at a yield of 85%.

Preparation of Fibers

Fibers were prepared using 0.1, 0.25, 0.50, and 1.0% of the additive prepared above. The surface energy of the fibers is tabulated below:

| Concentration of Additive, % | Surface Energy, ergs/cm² | |
| --- | --- | --- |
|  | Undrawn(16 mils) | Drawn(4 mils) |
| 1.0 | <18 | <18 |
| 0.5 | <18 | 25 |
| 0.25 | <18 | 25 |
| 0.1 | 25 | 32 |

Photomicrographs of the fibers revealed that a distinct band of the additive was present under the skin of the fiber. The fibers containing 1% of the additive could be drawn 4:1 in two stages, 170°C and 190°C, without distorting the band or the surface energy.

EXAMPLE 4

Preparation of Additive 1,7-Bis(perfluorooctanoyl-1,4,7-triazaheptane adipamide was prepared following the general method of Example 3, except adipyl chloride was substituted for isophthalylchloride. The product was a white solid having a melting point of 190°–195°C.

Preparation of Fibers

Fibers were prepared using 1% of the additive prepared above. An undrawn filament of 60 denier had a surface energy of less than 18 ergs/cm². When the filament was drawn 4:1, the resulting fiber had a surface of 25 ergs/cm².

Photomicrographs of the fibers revealed that the additive was present as a random distribution of particles throughout the resin matrix.

EXAMPLE 5

Preparation of Additive

A mixture of 258 grams of 12,12,13,13,14,14,15,15-octafluoro-15-heptafluoroisopropoxypentadecanoic acid and 410 grams of thionyl chloride was heated to reflux over a period of 40 minutes and then maintained at reflux for 3 hours. The reaction mixture was cooled to room temperature and excess thionyl chloride was evaporated off under vacuum to give 267 grams of crude acid chloride.

To a stirred solution of the crude acid chloride in 750 ml of benzene at 10°C was added 24.2 grams of N,N-dimethylaniline over a period of 15 minutes. A solution of 32.5 grams of activated sodium azide in 100 ml of water was then added dropwise over a period of 20 minutes as the temperature was maintained at less than 10°C. The reaction mixture was stirred for 30 minutes at 5°–10°C, and then at room temperature for 90 minutes. The benzene layer was separated, extracted with cold 10% hydrochloric acid, dried over sodium sulfate, heated to reflux and maintained at reflux for 2 hours. The product was $(CF_3)_2CFO(CF_2)_4(CH_2)_{10}NCO$, a colorless oil having a boiling point of 119°C at 0.5 mm Hg. This compound and its method of preparation are the invention of our colleague J. Murray and are the subject of U.S. patent application Ser. No. 868,216, filed Oct. 21, 1969, now U.S. Pat. No. 3,657,306.

The compound 12,12,13,13,14,14,15,15-octafluoro-15-heptafluoroisopropoxypentadecanoic acid is a known compound, being described in Canadian Patent Nos. 823,673 and 823,674, corresponding to U.S. Ser. Nos. 721,115 and 721,117, respectively, both U.S. applications having been filed on Apr. 12, 1968.

Preparation of Fibers

Fibers were prepared using 1% of the additive prepared above. An undrawn filament of 60 denier had a surface energy of 27 ergs/cm². When the filament was drawn 4:1 the resulting fiber had a surface energy of 32–35 ergs/cm². However, when the fiber was annealed at 130°–140°C for 2 hours, the surface energy was reduced to 27 ergs/cm². We theorize that during the drawing operation the additive is not sufficiently mobile to keep replenishing the newly generated surfaces, but that during the annealing step the additive migrates to the surface to render it equivalent to the surface of the undrawn fiber.

EXAMPLE 6

Preparation of Additive 65 grams of $C_3F_7O(CF_2)_4CH_2CH_2CN$ and 0.7 grams concentrated sulfuric acid in 100 ml of carbon tetrachloride were warmed to reflux. A solution of 4.6 grams of trioxane in 150 ml of carbon tetrachloride was added dropwise over a period of two hours. The reaction was continued at reflux for an additional 2 hours. The product precipitated upon cooling, was washed with water, dried, recrystallized from carbon tetrachloride and identified as

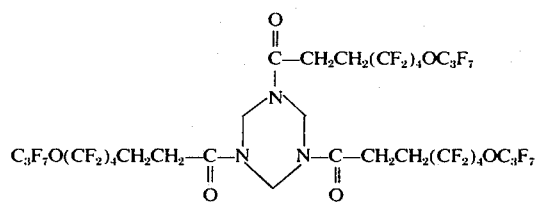

61.0 grams of white product, melting point 81–83°C, were obtained at a yield of 89%. From the mother liquor were recovered 7.0 grams of the bisamide

Preparation of Fibers

The two compounds prepared above are used in accordance with this invention to prepare fibers having improved soil and stain repellency.

EXAMPLE 7

Preparation of Additive 8.7 grams of tris(2-carboxyethyl)isocyanurate were dissolved in 20 grams of trifluoroacetic anhydride at 70°C. To the clear solution was added dropwise 14 grams of hexafluoroisopropanol. The mixture was reacted at 75°C for 3 hours. The solvent ($CF_3COOH$) was then removed by distillation and the residue was dissolved in chloroform. The product was washed with water, dried and recovered as a white solid, melting point 60°C, yield 100%. The product was identified as

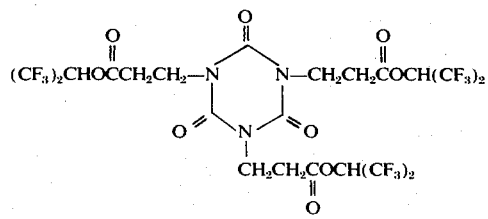

Preparation of Fibers

The additive prepared above is used in accordance with this invention to produce fibers having improved soil and stain repellency.

EXAMPLE 8

Preparation of Additive 89 grams (0.01 mol) of 1,7-bis(perfluorooctanoyl)-1,4,7-triazaheptane and 1.20 grams (0.01 mol) of phenylisocyanate were reacted in 50 ml of acetone for 5 minutes at reflux temperature. The reaction mixture was left standing at room temperature overnight. The mixture was diluted with an excess of water, which caused the product to separate as an oily layer which gradually solidified. The product was filtered off, air dried, and recrystallized from ethanol-water. The product, a white solid having a melting point of 115°–118°C, was obtained at a 95% yield and was identified as N,N-bis(perfluorooctanamido ethyl)-N'-phenyl urea.

Preparation of Fibers

The additive prepared above is used in accordance with this invention to produce fibers having improved soil and stain repellency.

EXAMPLE 9

The additive having the formula $C_3F_7O(CF_2)_4(CH_2)_3NHCO(CHOH)_4CH_2OH$ was prepared in 98% yield by reacting $C_3F_7O(CF_2)_4(CH_2)_3NH_2$ with $$\overline{OCH_2(CHOH)_4C=O}.$$

The additive is suitable for use in this invention.

EXAMPLE 10

The additive α-(perfluorooctanoamido)caprolactam, melting point 159°C, was prepared in 64% yield by reacting methyl perfluorooctanoate with α-amino caprolactam. The additive is suitable for use in this invention to impart soil and stain repellency to extruded synthetic fibers.

EXAMPLE 11

Fibers were prepared from a blend of 30% polyethylene terephthalate and 70% nylon-6 containing 0.5% of the additive of Example 3. An undrawn filament having a diameter of 16 mils had a surface energy of less than 18 ergs/cm². When the fiber was drawn 4:1, the resulting fiber had a surface energy of 22 ergs/cm².

EXAMPLE 12

Fibers were prepared from polypropylene containing 1% by weight 1,7 bis(perfluorooctanoyl)-4-stearoyl-1,4,7-triazaheptane. An undrawn filament of 60 denier had a surface energy of less than 18 ergs/cm². A control fiber containing no additive had a surface energy of 22 ergs/cm².

EXAMPLE 13

Fibers were prepared from polyethylene terephthalate containing 1% of the additive of Example 3. An undrawn filament of 60 denier had a surface energy of 27 ergs/cm². When the filament was drawn 4:1, the resulting fiber had the same surface energy, 27 ergs/cm². A control fiber of polyethylene terephthalate containing no additive had a surface energy of 42 ergs/cm².

We claim:

1. In a process for preparing a melt extruded filament of a melt extrudable fiber-forming thermoplastic resin selected from the group consisting of polypropylene, polyamide, polyester, polyacrylonitrile, and blends thereof, the improvement which comprises intimately blending with the resin prior to extruding the resin, from about 0.1 to about 2 percent by weight based on the weight of the resin of an additive which improves the soild and stain repellency of the filament, said additive being selected from the group consisting of:

a. monoamides of the formula $$R_f-C(O)-NHCH_2CH_2 \diagdown N-C(O)-R-C(O)-OH$$
$$R_f-C(O)-NHCH_2CH_2 \diagup$$

wherein R is an alkyl diradical of 1 to 8 carbon atoms, an alkylene diradical of 2 to 8 carbon atoms, or a phenyl diradical;

b. diamides of the formula $$R_f-C(O)-NHCH_2CH_2 \diagdown N-C(O)-R-C(O)-N \diagup CH_2CH_2NHC(O)-R_f$$
$$R_f-C(O)-NHCH_2CH_2 \diagup \diagdown CH_2CH_2NHC(O)-R_f$$

wherein R is an alkyl diradical of 1 to 8 carbon atoms, an alkylene diradical of 2 to 8 carbon atoms, a phenyl diradical, or a dicarboxy phenyl diradical having the formula

HOOC—⟨C₆H₄⟩—COOH c. hexahydrotriazines of the formula $$\begin{array}{c} R_f \\ | \\ C=O \\ | \\ N \\ / \quad \backslash \\ O \quad \quad O \\ \| \quad \quad \| \\ R_fCN \quad NCR_f \end{array}$$

d. bisamides of the formula $$R_f-C(O)NHC(R)(H)NHC(O)R_f$$

wherein R is hydrogen, trichloromethyl or a phenyl radical;

e. isocyanurate esters of the formula $$(R_f)HOOCCH_2CH_2-N \diagdown \text{(ring)} \diagup N-CH_2CH_2COOR_f$$
with CH₂CH₂COOH(R_f) substituent f. isocyanurate esters of the formula $$(R_fC)HOCH_2CH_2-N \diagdown \text{(ring)} \diagup N-CH_2CH_2OCR_f$$
with CH₂CH₂OH(CR_f) substituent g. substituted ureas of the formula

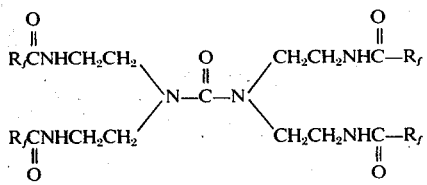

h. substituted ureas of the formula

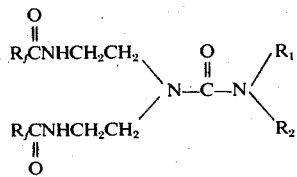

wherein $R_1$ and $R_2$ are independently hydrogen or an alkyl radical of 1 to 6 carbon atoms, and alkylene radical of 2 to 6 carbon atoms, or a phenyl radical;

i. substituted ureas of the formula

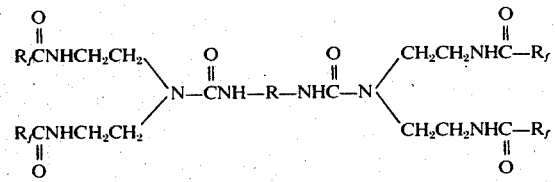

wherein R is an alkyl diradical of 1 to 13 carbon atoms, an alkylene diradical of 2 to 13 carbon atoms, or an aryl, aralkyl or aralkylene diradical of 6 to 13 carbon atoms; and j. substituted oxamides of the formula

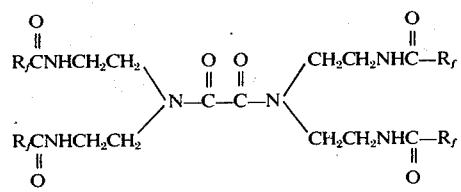

$R_f$ being, in each of the above formulas, selected from the group consisting of fluoroalkyl groups having the formula $$Y(CF_2)_m(CH_2)_n-$$

wherein $m$ is an integer from 1 to 16, $n$ is an integer not greater than $m$ from 0 to 8, with the sum of $m$ plus $n$ being from 1 to 20, and Y is selected from the group consisting of $F_3C-$ and radicals having the formula

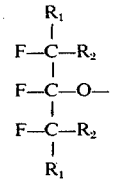

wherein $R_1$ and $R_2$ are fluorine or perfluoroalkyl groups having from 1 to 2 carbon atoms, provided that not more than three of the $R_1$ and $R_2$ groups are perfluoroalkyl groups said additive having a surface energy of less than 20 ergs/cm² and being thermally stable and nonfugative at the temperature at which the filament is extruded.

2. The improvement of claim 1 wherein the resin is nylon-6 or nylon-66 and the additive is 1,7-bis(4-perfluoroisopropoxybutyryl)-1,4,7-triazaheptane monoglutaramide.

3. The improvement of claim 1 including the additional step of annealing the extruded filament to lower the surface energy of the filament.

4. The improvement of claim 1 wherein said additive is blended with the resin prior to extruding the resin in an amount of from 0.5 to 1.5 percent by weight based on the weight of the resin.

* * * * *